United States Patent [19]

Abe

[11] Patent Number: 4,839,810

[45] Date of Patent: Jun. 13, 1989

[54] AUTOMATIC RHYTHM PERFORMANCE APPARATUS HAVING ENDING PERFORMANCE FUNCTION

[75] Inventor: Yasunao Abe, Hamamatsu, Japan

[73] Assignee: Yamaha Corporation, Hamamatsu, Japan

[21] Appl. No.: 187,283

[22] Filed: Apr. 28, 1988

[30] Foreign Application Priority Data

May 29, 1987 [JP] Japan ........................ 62-133845

[51] Int. Cl.$^{4}$ ........................ G01H 1/42

[52] U.S. Cl. ........................ 364/419; 84/1.03; 84/DIG. 12

[58] Field of Search ........................ 36/419; 84/1.03, 170, 84/DIG. 12

[56] References Cited

U.S. PATENT DOCUMENTS 4,326,441 4/1982 Imamura ........................ 84/1.03
4,646,610 3/1987 Sakurai ........................ 84/1.03
4,704,933 11/1987 Kurakake ........................ 84/1.03
4,708,046 11/1987 Kozuki ........................ 84/1.03
4,719,834 1/1987 Hall ........................ 84/1.03
4,742,748 5/1988 Tateishi ........................ 84/DIG. 12
4,757,736 7/1988 Tajima ........................ 84/1.03
4,773,294 9/1988 Iizuka ........................ 84/DIG. 12

*Primary Examiner*—Joseph Ruggiero
*Assistant Examiner*—Gail O. Hayes
*Attorney, Agent, or Firm*—Spensley Horn Jubas & Lubitz

[57] ABSTRACT

An automatic rhythm performance apparatus comprises at least a rhythm pattern memory for pre-storing plural kinds of rhythm patterns, an ending switch and a rhythm tone source. The rhythm patterns correspond to rhythm performances such as the Latin American Music, the Rumba Music and the Tango Music. Each of these rhythm patterns comprises one normal pattern and at least one ending pattern. Normally, the rhythm tone source generates rhythm tones in accordance with the normal pattern which corresponds to a normal part of a tune. When the ending switch is manipulated, the rhythm tone source generates other rhythm tones in accordance with the ending pattern, so that an ending rhythm performance is executed from a start timing determined by the manipulating timing of the ending switch. When each rhythm pattern consists of two ending patterns, the ending rhythm performance is executed in accordance with selected one of the ending patterns.

7 Claims, 5 Drawing Sheets

(CONTENTS OF RHYTHM PATTERN MEMORY 6)

(CONTENTS OF RHYTHM PATTERN MEMORY 6)

(RHYTHM PERFORMANCE PROCESSING OPERATION)

AUTOMATIC RHYTHM PERFORMANCE APPARATUS HAVING ENDING PERFORMANCE FUNCTION

BACKGROUND OF THE INVENTION

1. Field of the Invention

The present invention generally relates to an automatic rhythm performance apparatus, and more particularly to an automatic rhythm performance apparatus having ending performance function which can play an ending performance in accordance with an ending pattern.

2. Prior Art

Some automatic rhythm performance apparatuses provide ending performance means by which the ending (rhythm) performance can be played in accordance with an ending portion of a musical tune to be played.

Examples are disclosed in Japanese Utility Model Publication No. 60-14317 and Japanese Patent Publication No. 59-31719 (which were proposed by the same assignee with the present applicant). Such conventional automatic rhythm performance apparatuses store the ending pattern for the ending performance in advance. Thereafter, in an ending period of a tune, the ending performance is started from a predetermined starting point next to a bar after a player operates manipulation members.

However, in the conventional automatic rhythm performance apparatus as described above, a start timing of the ending performance is normally fixed at a starting point of a bar next to a bar after the player operates the manipulation members. Hence, it is impossible to play variable ending performances.

SUMMARY OF THE INVENTION

It is accordingly a primary object of the present invention to provide an automatic rhythm performance apparatus having ending performance function which can play natural and variable ending performances.

In a first aspect of the present invention, there is provided an automatic rhythm performance apparatus having ending performance function comprising:

(a) an ending manipulation member for commanding an ending performance to be executed;

(b) judging means for judging whether the ending manipulation member is manipulated before or after a set timing within one bar;

(c) ending start control means for controlling a start timing of the ending performance based on a judgment result of the judging means, the ending start control means starting the ending performance at a timing which advances by a predetermined timing from a start timing of a next bar when the ending manipulation member is manipulated before the set timing, the ending start control means starting the ending performance at the start timing of the next bar when the ending manipulation member is manipulated after the set timing; and (d) ending performance means for executing the ending performance based on a predetermined ending pattern from a start timing determined by the ending start control means.

In a second aspect of the present invention, there is provided an automatic rhythm performance apparatus having ending performance function comprising:

(a) memory means for pre-storing a plurality of rhythm patterns each comprising a normal pattern and an ending pattern;

(b) rhythm selecting means for selecting one of the rhythm patterns;

(c) ending control means for commanding an ending performance to be or not to be executed, reading out the ending pattern of the rhythm pattern selected by the rhythm selecting means from the memory means and determining a start timing of the ending rhythm performance; and (d) rhythm source means for generating a rhythm tone in accordance with the normal pattern of the rhythm pattern selected by the rhythm selecting means when the ending control means commands the ending performance not to be executed, the rhythm source means generating another rhythm tone in accordance with the ending pattern to thereby execute the ending performance from the start timing when the ending control means commands the ending performance to be executed.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF THE PREFERRED EMBODIMENT

First, description will be given with respect to a basic constitution of the present invention in conjunction with FIG. 1.

Figure 1:
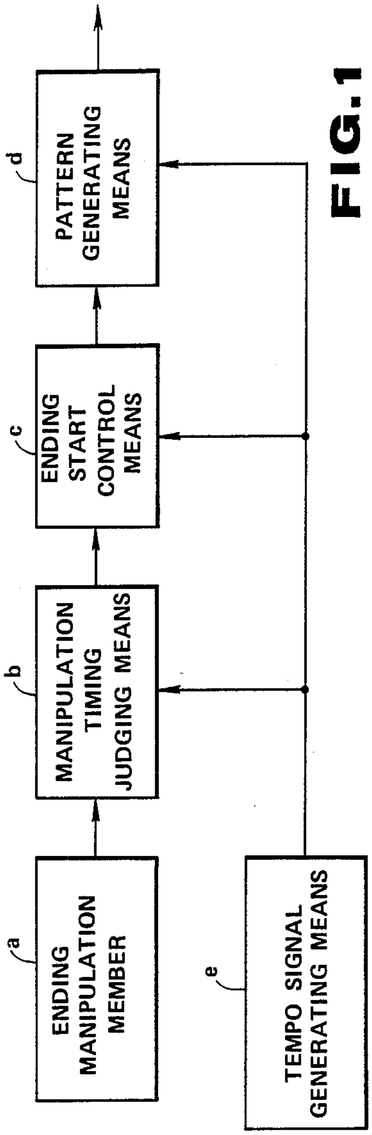
FIG. 1 is a functional block diagram showing a basic constitution of the present invention.

In FIG. 1, "a" designates an ending manipulation member which is operated in order to execute the ending (rhythm) performance, and "e" designates tempo signal generating means for outputting a tempo signal $S_T$ corresponding to a tempo of the tune. In addition, "b" designates manipulation timing judging means for judging at which portion the ending manipulation member "a" is operated, and "c" designates ending start control means for determining a start timing when the ending performance is started to be executed. In this ending start control means, it is judged whether the rhythm performance advances to the start timing of the ending performance or not based on the tempo signal $S_T$. At such start timing, the ending start control means "c" commands pattern generating means "d" to generate the ending pattern for the ending performance. Then, the pattern generating means "d" generates the ending pattern at a speed according to the tempo signal $S_T$, and such ending pattern is supplied to predetermined rhythm music generating means. Based on the above-mentioned functions of the means "b" to "d", the manipulation timing determined by the ending manipulation member "a" adequately controls the start timing of the ending performance.

[A] CONSTRUCTION OF PRESENT EMBODIMENT

Figure 2:
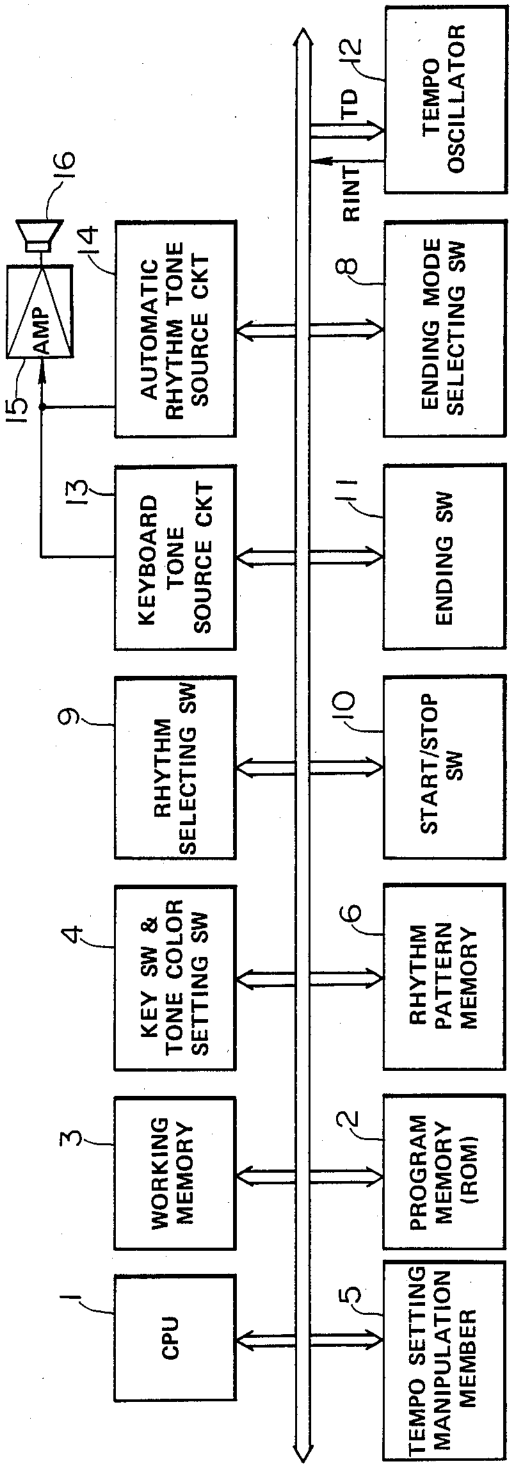
FIG. 2 is a block diagram showing an embodiment of the present invention.
Figure 3:
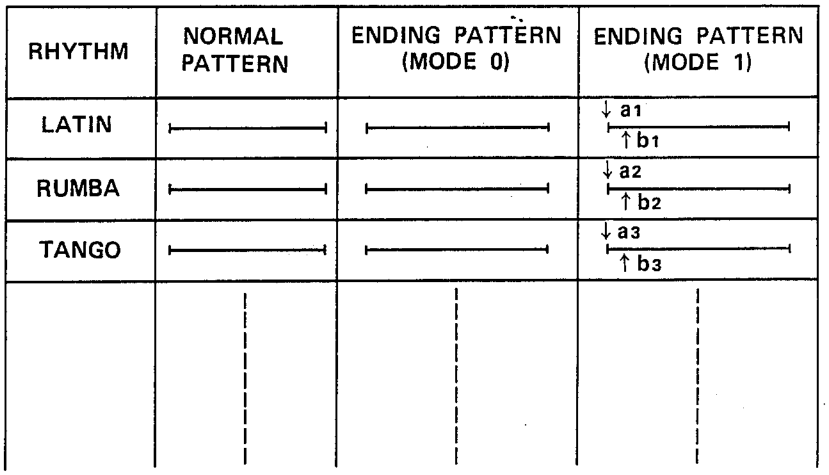
FIG. 3 is a conceptional view showing storing contents of a rhythm pattern memory shown in FIG. 2.

Next, description will be given with respect to the electrical construction of the present embodiment in conjunction with FIGS. 2 and 3. FIG. 2 is a block diagram showing an electrical construction of an electronic musical instrument as an embodiment of the present invention.

In FIG. 2, a central processing unit (CPU) 1 controls several portions of the present apparatus in accordance with programs stored in a program memory 2. In addition, 3 designates a working memory (consisting of a random access memory; RAM) for storing various kinds of data in an operation of the CPU 1, 4 designates key switches and tone color setting switches provided on an operation panel (not shown), and 5 designates a tempo setting manipulation member for setting the tempo of the rhythm performance. Further, 6 designates a rhythm pattern memory (consisting of a read only memory and a random access memory; ROM and RAM) for storing various kinds of rhythm patterns corresponding to various kinds of rhythm performances such as Latin American Music, Rumba Music and Tango Music. Each rhythm pattern consists of a normal pattern and two ending patterns. The normal pattern is performed in a normal part of tune (except for the ending part of the tune), while each ending pattern of two bars is performed at the ending part of the tune. One of these two ending patterns is selected by an ending mode selecting switch 8. The ending pattern (of ending mode "0") is a rhythm pattern performed from the first note of the first bar to the last note of the second bar within the ending part. On the other hand, another ending pattern (of ending mode "1") is a rhythm pattern performed from the note preceding to the first note of the first bar to the note preceding to the last note of the second bar within the ending part. In one case, the head data of the stored ending pattern are started to be read from the rhythm pattern memory 6 in the ending pattern (of ending mode "1") as shown by positions "a1" to "a3" in FIG. 3. In other words, data corresponding to the note preceding to the first note of the first bar are started to be read from the rhythm pattern memory 6 in the ending part of the tune. In another case, data corresponding to the second note of the ending pattern are started to be read from the rhythm pattern memory 6 as shown by positions "b1" to "b3" in FIG. 3. In other words, data corresponding to the first note of the first bar are read from the rhythm pattern memory 6 in the ending part of the tune.

In FIG. 2, 9 designates a rhythm selecting switch for selecting one of the rhythm performances such as Latin American Music, Rumba Music and Tango Music, 10 designates a start/stop switch for commanding start and stop of the automatic rhythm performance, and 11 designates an ending switch which is manipulated in order to execute the ending performance. In addition, a tempo oscillator 12 generates a pulse signal having a frequency corresponding to tempo data TD supplied from the CPU 1, and such pulse signal determines the tempo of the automatic rhythm performance. Such pulse signal is supplied to the CPU 1 as a rhythm interrupt pulse RINT. In the present embodiment, a period of one bar is set equal to a period of thirty two pulses of the rhythm interrupt pulse RINT outputted from the tempo oscillator 12.

Next, a keyboard tone source circuit 13 generates a musical tone signal corresponding to a depressed key of the keyboard, and an automatic rhythm tone source circuit 14 generates a rhythm tone signal corresponding to the rhythm pattern read from the rhythm pattern memory 6. The output signals of these circuits 13 and 14 are both amplified in an amplifier 15 and then supplied to a speaker 16.

[B] OPERATIONS OF PRESENT EMBODIMENT

Next, description will be given with respect to operations of the present invention in conjunction with FIGS. 4 to 6.

(1) WHOLE OPERATION

Figure 4:
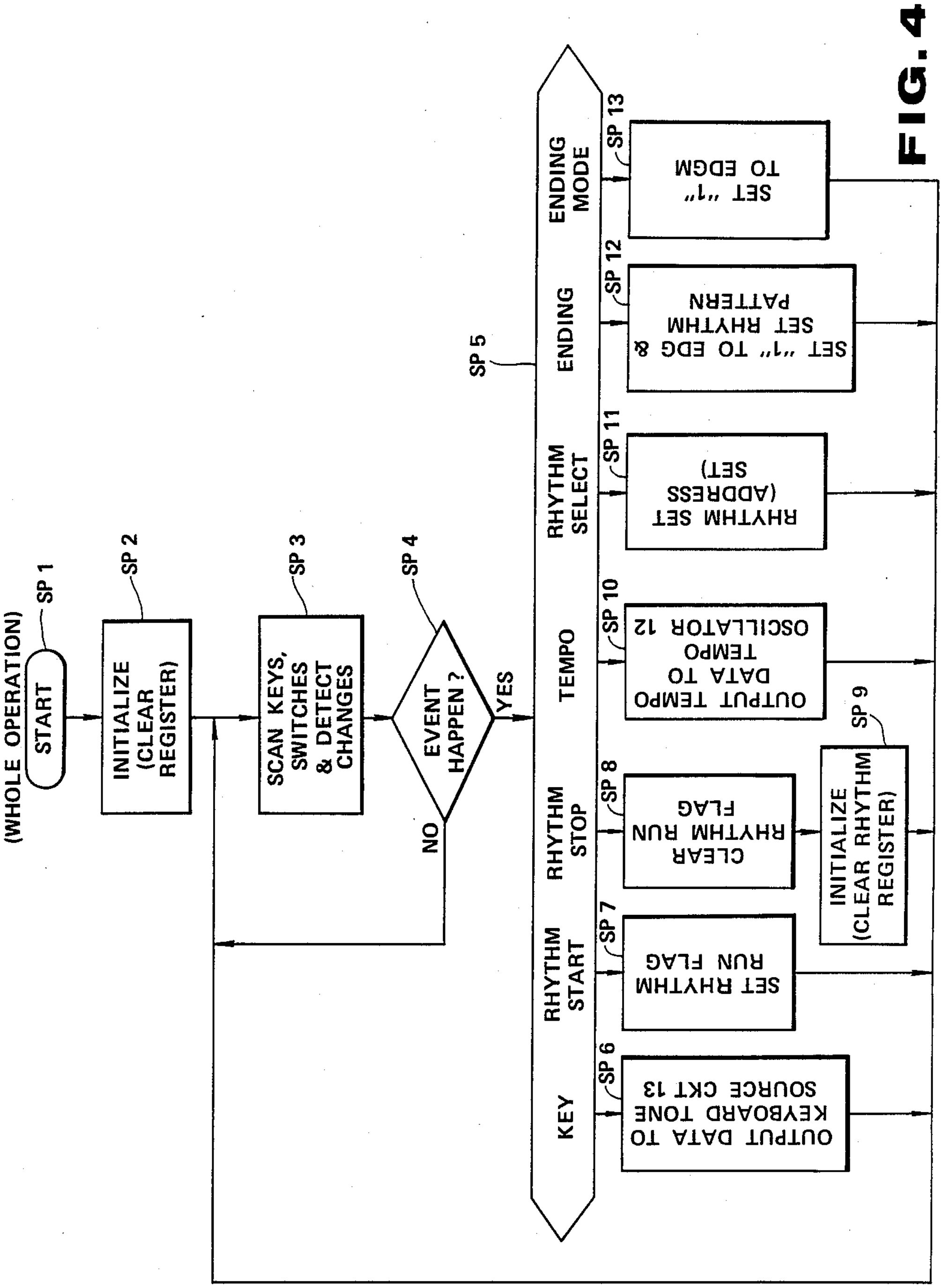
FIG. 4 is a flowchart showing whole operations of the embodiment shown in FIG. 2.

FIG. 4 is a flowchart showing a whole operation of the present invention.

First, when the power is applied to the present apparatus, several portions of the present apparatus are initialized. At this time, the CPU 1 clears various kinds of registers which have been set in the CPU 1 and the working memory 3 in steps SP1 and SP2 shown in FIG. 4. Next, the processing proceeds to a step SP3 wherein the CPU 1 sequentially scans the pre-mentioned switches such as the key switches/tone color setting switches 4, the ending mode selecting switch 8, the rhythm selecting switch 9, the start/stop switch 10 and the ending switch 11 so as to detect whether any changes are happened to operating states of these switches or not. In a step SP4, the CPU 1 judges whether any events are happened or not based on the detection result of the step SP3. In this case, "the event" means a change in a state of switch, such that the switch is operated from ON to OFF or from OFF to ON. If the CPU 1 detects any events in the step SP4, the processing proceeds to a next step SP5. If not, the processings of a loop consisting of the steps SP3 and SP4 are repeatedly executed until any events are detected in the step SP4.

In the step SP5, it is detected at which switch the event is happened, and then one of the following processings is selected in response to the switch at which the event is happened. In the case where the event is happened at the key switch, the processing proceeds to a step SP6 wherein the keyboard tone source circuit 13 is supplied with information concerning the key switch at which the event is happened. Thus, the CPU 1 controls generation and elimination of a musical tone corresponding to the key switch at which the event is happened.

In the case where the event is happened at start side of the start/stop switch 10, the processing proceeds to a step SP7 wherein a rhythm run flag is set to value "1". On the other hand, in the case where the event is happened at stop side of the start/stop switch 10, the processing proceeds to a step SP8 wherein the rhythm run flag is cleared, and then the processing proceeds to a step SP9 wherein the CPU 1 clears various kinds of registers (which will be described later in detail) used for a rhythm process. In the case where the event is happened at the tempo setting manipulation member 5, the processing proceeds to a step SP10 wherein newly set tempo data TD are supplied to the tempo oscillator 12. Thus, the tempo oscillator 12 outputs the rhythm interrupt pulse RINT at a speed (or frequency) corresponding to a set value of the tempo setting manipulation member 5. In the case where the event is happened at the rhythm selecting switch 9, the processing proceeds to a step SP11 wherein reading address of the rhythm pattern memory 6 (see FIG. 3) is set as address corresponding to the normal pattern of the rhythm performance which is selected by the rhythm selecting switch 9. When the ending mode selecting switch 8 is depressed, the processing proceeds to a step SP13 wherein value "1" is set to an ending mode flag EDGM. When the ending switch 11 is depressed, the processing proceeds to a step SP12 wherein value "1" is set to an ending flag EDG to thereby set address of the ending pattern of the selected rhythm performance. In this case, when the value of the ending mode flag EDGM is equal to "1", the ending pattern of the mode "1" is selected. On the other hand, when the value of the ending mode flag EDGM is equal to "0", the ending pattern of the mode "0" is selected. In this case, content of a ending part flag (which will be described later) determines whether the normal pattern is selected or the ending pattern is selected. More specifically, when the value of such ending part flag is "0", the normal pattern is selected. On the other hand, when the value of such ending part flag is "1", the ending pattern is selected.

After completing the above-mentioned processes of the steps SP6 to SP13, the processes of the loop consisting of the steps SP3 and SP4 are repeatedly executed so that the state of the present apparatus is set to a standby state for waiting the next event to be happened.

(2) RHYTHM PERFORMANCE PROCESSING OPERATION

(a) NORMAL PATTERN PROCESSING OPERATION

Figure 5A:
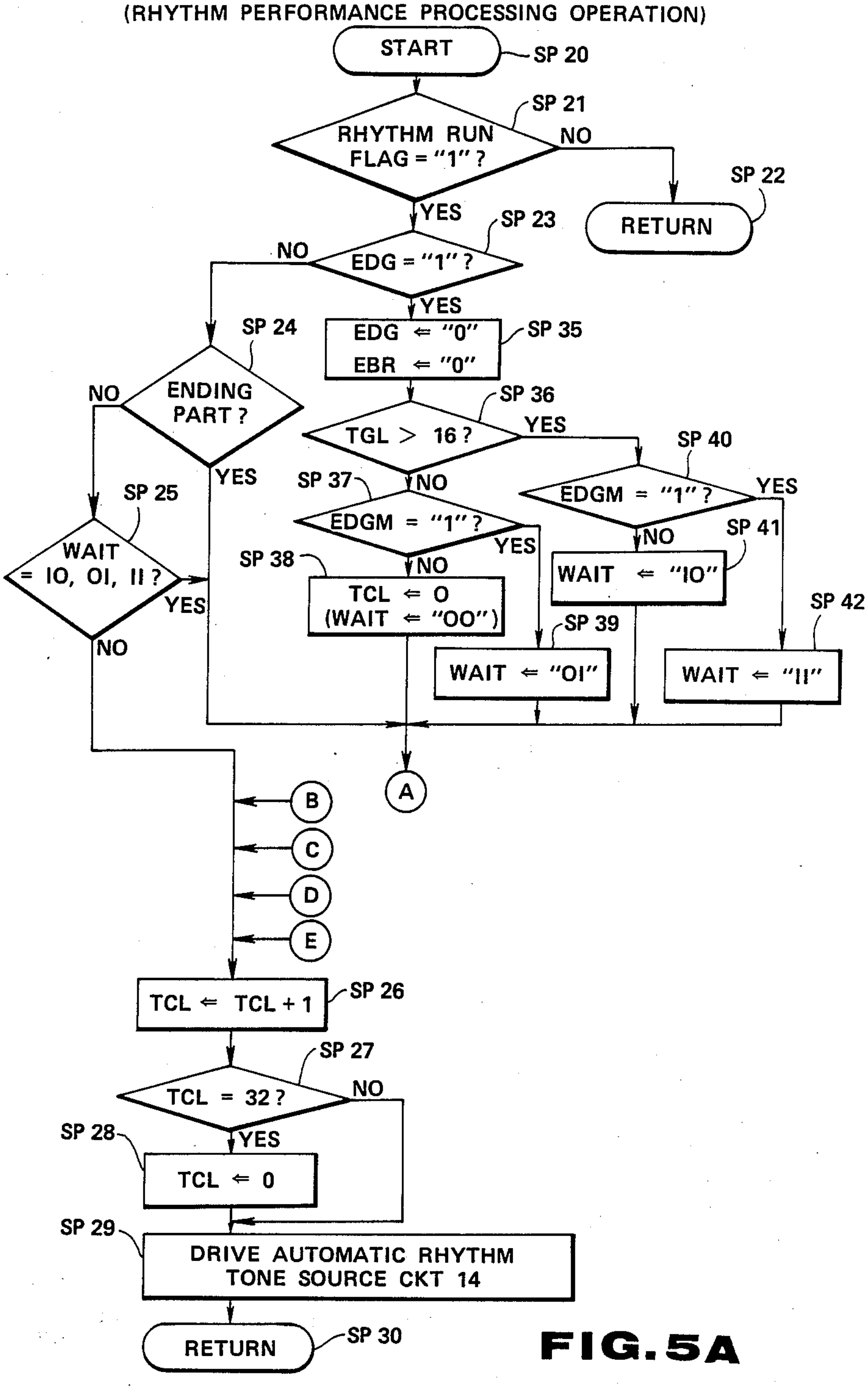
FIGS. 5A and 5B are flowcharts both showing a rhythm performance processing operation.
Figure 5B:
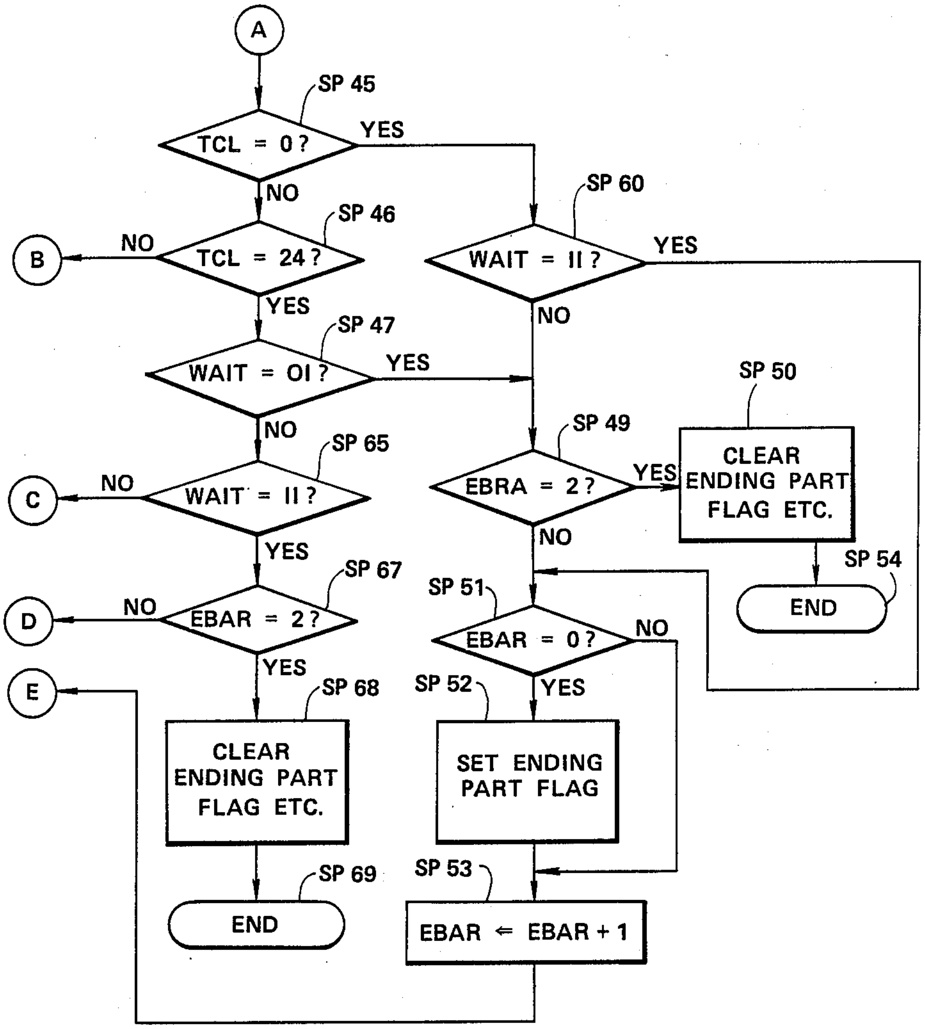

At every time when the tempo oscillator 12 outputs the rhythm interrupt pulse RINT, a subroutine shown in FIGS. 5A and 5B is executed. In this subroutine, the CPU 1 judges whether the value of the rhythm run flag is equal to "1" or not in steps SP20 and SP21. If the judgment result of this step SP21 is "NO", it can be judged that the start side of the start/stop switch 10 has not been depressed yet or the stop side thereof has been already depressed. In this case, the rhythm performance process is not executed, and the processing proceeds to the main routine shown in FIG. 4 via a step SP22.

On the other hand, if the judgment result of the step SP21 is "YES", the processing proceeds to a step SP23 wherein it is judged whether the value of the ending flag EDG is equal to "1" or not. In the normal rhythm pattern, the ending switch 11 is not depressed so that the judgment result of the step SP21 is turned to "NO", and the processing proceeds to a step SP24. In this step SP24, it is judged whether the value of the ending part flag is equal to "1" or not. In a next step SP25, it is judged that content of a register WATT is identical to binary value (10), (01) or (11). At this time, the value of the ending part flag and the content of the register WATT have not been set yet, which will be described later. Therefore, the judgment result of these steps SP24 and SP25 are both turned to "NO", hence, the processing proceeds to a step SP26.

Next, a tempo clock register TCL counts the rhythm interrupt pulse RINT, and content of this tempo clock register TCL is incremented by one in the step SP26. Thereafter, the processing proceeds to a step SP27 wherein it is judged whether the content of the tempo clock register TCL is equal to value of thirty two or not. In other words, it is judged whether the present timing is identical to an end timing of one bar or not in the step SP27. If the judgment result of this step SP27 is "NO", the processing proceeds to a step SP29. On the other hand, if the judgment result of this step SP27 is "YES", the processing proceeds to a step SP28 wherein the content of the tempo clock register TCL is cleared to "0". As described before, the rhythm pattern memory 6 stores the data representing the normal pattern corresponding to the rhythm performance selected by the rhythm selecting switch 9. Hence, in the step SP29, the CPU 1 reads out data at a position corresponding to the content of the tempo clock register TCL within the above-mentioned data stored in the rhythm pattern memory 6. Such read data are supplied to the automatic rhythm tone source circuit 14, whereby the rhythm tone is to be generated. After generating the rhythm tone, the processing returns back to the main routine shown in FIG. 4 in a step SP30, and thereafter, the above-mentioned processes in the steps SP20 to SP30 are executed at every time when the tempo oscillator 12 outputs the rhythm interrupt pulse RINT. Thus, the normal patterns corresponding to the selected rhythm performance will be sequentially read from the rhythm pattern memory 6 in accordance with count value of the rhythm interrupt pulse RINT (i.e., value of the register TCL), whereby the normal rhythm performance will be executed.

(b) ENDING PATTERN PROCESSING OPERATION

Next, description will be given with respect to an ending pattern processing operation. The present embodiment provides four types of ending processes, and one of these four ending processes is selected by the ending mode selecting switch 8 and a manipulating timing of the ending switch 11.

Next, description will be given with respect to these four ending patterns respectively in conjunction with FIG. 6. The straight line shown in FIG. 6(*a*) designates a processing of the rhythm performance. Each value written on this line indicates a count content of the tempo clock register TCL.

Figure 6:
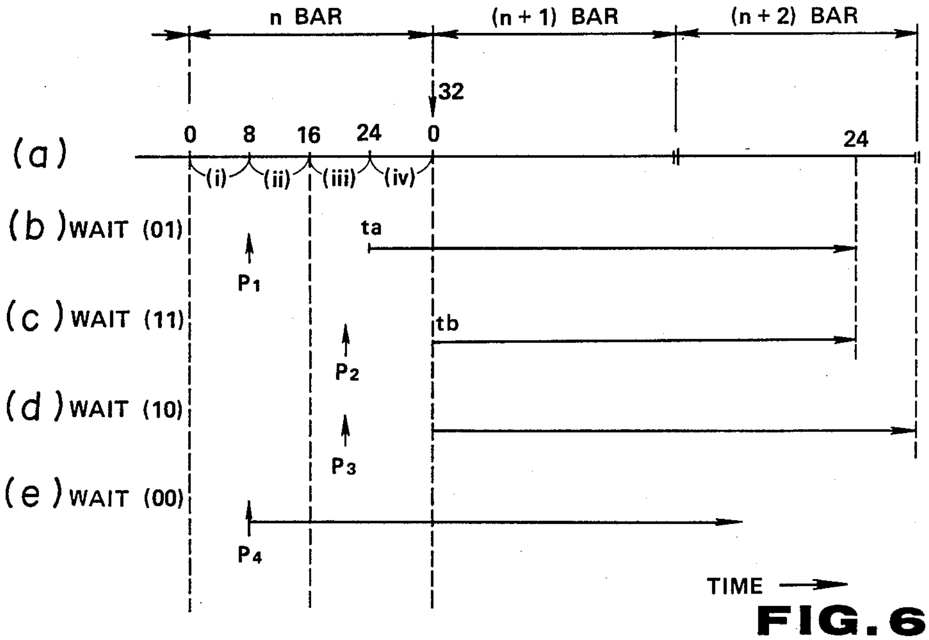
FIG. 6 is a timing chart showing an ending process.

First, in the case where the ending mode "1" is selected, processes shown by FIGS. 6(*b*) and 6(*c*) are executed.

FIG. 6(*b*) shows a process in the case where the ending switch 11 is depressed (as shown by an arrow $P_1$) before former two notes of an arbitrary n-th bar are completely performed, i.e., in the case where the ending switch 11 is depressed when the content (i.e., the decimal value) of the tempo clock register TCL is smaller than sixteen. In this case, the ending pattern of the ending mode "1" is started to be read from the rhythm pattern memory 6 at a timing of a note preceding to (n+1) bar, i.e., at a time ta (corresponding to the positions a1 to a3 shown in FIG. 3) when the content of the tempo clock register TCL becomes equal to twenty four. According to such read ending pattern, the ending rhythm performance will be executed. Thereafter, such ending rhythm performance will be stopped at a timing of a third note of (n+2) bar (i.e., at a timing when the content of the register TCL becomes equal to twenty four).

FIG. 6(*c*) shows a process in the case where the ending switch 11 is depressed (as shown by an arrow $P_2$) during a period of latter two notes of the n-th note, i.e., in the case where the ending switch 11 is depressed when the content of the tempo clock register TCL exceeds sixteen. In this case, the ending performance is stood by and the normal performance is executed until a starting point of the (n+1) bar. At a time tb (corresponding to the positions b1 to b3 shown in FIG. 3) representative of the head position of the (n+1) bar (i.e., when the content of the tempo clock register TCL becomes equal to zero), the ending pattern of the ending mode "1" is read from the rhythm pattern memory 6. In accordance with such read ending pattern, the ending performance is executed. Thereafter, the ending performance is completed at a third note of (n+2) bar (i.e., at a timing when the content of the register TCL becomes equal to twenty four).

Meanwhile, in the case where the ending mode "0" is selected, processes shown in FIGS. 6(*d*) and 6(*e*) are executed.

More specifically, FIG. 6(*d*) indicates the case where the ending switch 11 is depressed (as shown by an arrow $P_3$) during the period of the latter two notes of the n-th bar. In this case, as similar to the process shown in FIG. 6(*c*), the ending performance based on the ending pattern of the ending mode "0" is executed from the starting point of the (n+1) bar. Thereafter, such ending performance is completed at the last note of (n+2) bar.

FIG. 6(*e*) indicates the case where the ending switch 11 is depressed (as shown by an arrow $P_4$) during the period of the former two notes of the n-th bar. Just after the ending switch 11 is depressed, the ending performance based on the ending pattern of the ending mode "0" is executed. When the ending pattern of two bars are all read from the rhythm pattern memory 6, such ending performance is completed.

Next, description will be given with respect to the procedure for executing the above-mentioned processes in conjunction with FIG. 5B.

The ending processes are executed in the case where the player depressed the ending switch 11 while the rhythm performance is executed based on the normal pattern. When this ending switch 11 is depressed, the value of the ending flag EDG is turned to "1" (in the step SP12 shown in FIG. 4). Thus, the judgment result of the step SP23 shown in FIG. 5A turns to "YES", and the processing proceeds to a step SP35 wherein the ending flag EDG and a register EBAR is both reset. Thereafter, the processing proceeds to a step SP36 wherein it is judged whether the content of the tempo clock register TCL exceeds sixteen or not. The judgment result of the step SP36 becomes "NO" in the case where the ending switch 11 is depressed during a period of former two notes of a certain bar. In other words, the judgment result of the step SP36 becomes "NO" in the case shown by FIG. 6(*b*) or 6(*e*). When the judgment result of the step SP36 is "NO", the processing proceeds to a step SP37 wherein it is judged whether the value of the ending mode flag EDGM is equal to "1" or not. The judgment result of the step SP36 turns to "YES" in the case shown in FIG. 6(*b*). In this case, the processing proceeds to a step SP39 wherein the binary value (01) is put into the register WAIT. On the other hand, the judgment result of the step SP37 becomes "NO" in the case shown by FIG. 6(*e*). In this case, the processing proceeds to a step SP38 wherein the tempo clock register TCL is cleared and the binary value (00) is put into the register WAIT.

Meanwhile, the judgment result of the step SP36 turns to "YES" in the cases shown by FIGS. 6(*c*) and 6(*d*). In this case, the processing proceeds to a step SP40 wherein it is judged whether the value of the ending mode flag EDGM is equal to "1" or not. The judgment result of the step SP40 turns to "YES" in the case shown by FIG. 6(*c*), while the judgment result of the step SP40 turns to "NO" in the case shown by FIG. 6(*d*). When the judgment result of the step SP40 is "YES", the processing proceeds to a step SP42 wherein the binary value (11) is put into the register WAIT. When the judgment result of the step SP40 is "NO", the processing proceeds to a step SP41 wherein the binary value (10) is put into the register WAIT.

As described heretofore, one of the processes shown by FIGS. 6(*b*) to 6(*e*) is determined to be executed in the steps SP36 to SP42. Thereafter, processes in steps SP45 etc. shown in FIG. 5B will be executed. Hereinafter, description will be given with respect to the processes shown by FIGS. 6(*b*) to 6(*e*) respectively.

(i) PROCESS OF FIG. 6(*b*)

In this process of FIG. 6(*b*), the judgment result of the step SP45 turns to "NO". Hence, the processing proceeds to a step SP46 wherein it is judged whether the content of the tempo clock register TCL is equal to twenty four or not. In other words, in this step SP46, it is judged whether the present timing is a start timing of the fourth note of bar or not (see FIG. 6(*a*)). If the judgment result of this step SP46 is "NO", the processing proceeds to the steps SP26, SP27, SP29 and SP30, and then the processing returns to the main routine (see FIG. 4). More specifically, the content of the tempo clock register TCL is incremented by one, and then the processing returns to the main routine.

Next, when the tempo oscillator 12 outputs the rhythm interrupt pulse RINT, the processing proceeds to the step SP25 via the steps SP20, SP21, SP23 and SP24 shown in FIG. 5A. At this time, the content of the register WAIT is identical to (01), hence, the judgment result of the step SP25 turns to "YES". Therefore, the processing proceeds to the step SP46 via the step SP45 shown in FIG. 5B. In this step SP46, it is repeatedly judged whether the content of the tempo clock register TCL ss equal to twenty four or not. If the judgment result of the step SP46 is "NO", the above-mentioned processes are repeatedly executed at every time when the tempo oscillator 12 outputs the rhythm interrupt pulse RINT. Therefore, the rhythm performance is continuously executed in accordance with the normal pattern.

By repeatedly executing the above-mentioned processes, the content of the tempo clock register TCL reaches at twenty four. At this time, the processing proceeds to a step SP49 via steps SP46 and SP47. In this step SP49, it is judged whether the content of the register EBAR is equal to "2" or not. This register EBAR has been cleared in the step SP2 or SP35. Hence, the judgment result of the step SP49 turns to "NO", and the processing proceeds to a step SP51 wherein it is judged whether the value of the register EBAR is equal to "0" or not. Naturally, the judgment result of this step SP51 is "YES", hence, the processing proceeds to a step SP52 wherein the value of the ending part flag is set to "1" so that the ending pattern of the ending mode "1" is designated. In this case, the reading start position is represented by one of the positions a1 to a3 shown in FIG. 3.

In a next step SP53, the content of the register EBAR is incremented by one, and then the processing proceeds through the steps SP26, SP27 and SP29, whereby the automatic rhythm tone source circuit 14 is driven. Since the value of the ending part flag is set to "1", the ending pattern of the mode "1" is read from the rhythm pattern memory 6. Therefore, after this time (represented by the time ta shown in FIG. 6(*b*)), the ending performance is started to be executed in accordance with the ending pattern of the mode "1", instead of executing the normal performance.

Next, when the tempo oscillator 12 outputs the rhythm interrupt pulse RINT again, and the processing proceeds to the step SP24 via the steps SP20, SP21 and SP23. Since the judgment result of the step SP24 is "YES", the processing proceeds to the step SP45. Then, the processing proceeds to the step SP29 via the steps SP46, SP26 and SP27. Thereafter, at every time when the tempo oscillator 12 outputs the rhythm interrupt pulse RINT, the above-mentioned processes are repeatedly executed so that the rhythm tones for the ending performance are generated in correspondence with the content of the tempo clock register TCL in the step SP29. When the content of the tempo clock register TCL becomes equal to thirty two, the judgment result of the step SP27 turns to "YES", and then the register TCL is cleared in the step SP28.

Therefore, when the next rhythm interrupt pulse RINT is outputted so that the subroutine shown in FIGS. 5A and 5B is started, the processing proceeds to the step SP45 via the step SP20 etc., and then the judgment result of the step SP45 turns to "YES". Then, after the processing proceeds through the steps SP60, SP49, SP51 and SP53 so that the content of the register EBAR is set to "2", the processes in the steps SP26 to SP30 are executed. Thereafter, the processes in the steps SP20, SP21, SP23, SP24, SP45, SP46 and SP26 to SP30 are repeatedly executed. In this case, the judgment result of the step SP46 turns to "YES" when the content of the tempo clock register TCL becomes equal to twenty four (i.e., when the third note of (n+1) bar shown in FIG. 6 is completed). Thereafter, the processing proceeds to a step SP50 via the steps SP47 and SP49. After the ending part flag is reset in the step SP50, the processing proceeds to a step SP54 wherein the automatic rhythm performance is completed.

(ii) PROCESS OF FIG. 6(*c*)

In the process of FIG. 6(*c*), after executing the process in the step SP42, the processing proceeds through a first path consisting of the steps SP45, SP46 and SP26 or a second path consisting of the steps SP45, SP46, SP47, SP65, SP67 and SP26, and then the processes in the steps SP26 to SP30 are executed. In short, the similar processes as described above are executed, regardless of the judgment result of the step SP46. At the last timing of the n-th bar as shown in FIG. 6, the tempo clock register TCL is cleared in the step SP28. Hence, when the next rhythm interrupt pulse RINT is outputted, the judgment result of the step SP45 turns to "YES" so that the processing proceeds from the step SP60 to the step SP52. Next, the processing proceeds to the step SP53 wherein the content of the register EBAR is set to "1", and then the processes in the steps SP26 to SP30 are executed. Accordingly, the ending pattern of the mode "1" is read from the position tb (shown in FIG. 6(*c*)) of the rhythm pattern memory 6. Thereafter, the processes in the steps SP26 to SP30 are executed at every time when the rhythm interrupt pulse RINT is outputted.

Next, after the tempo clock register TCL is cleared, the processing passes through the steps SP45, SP60 and SP51, and then the processing proceeds to the step SP53 wherein the content of the register EBAR is set to "2". Thereafter, at every time when the rhythm interrupt pulse RINT is outputted again, the processes in the steps SP26 to SP30 are repeatedly executed. When the content of the tempo clock register TCL becomes equal to twenty four, the processing passes through the steps SP47, SP65, SP67 and SP68, and then the processing proceeds to a step SP69 wherein the automatic rhythm performance is completed. In other words, when the third note of (n+1) bar (shown in FIG. 6) is completely performed, the ending performance is completed.

(iii) PROCESS OF FIG. 6(*d*)

In the process of FIG. 6(*d*), the start timing of the ending performance is controlled as similar to the case shown in FIG. 6(*c*). More specifically, the reading operation of the ending pattern is stood by until the start timing of the next bar (i.e., until the tempo clock register TCL is cleared in the step SP28). In this case, the ending pattern of the mode "0" is read from the rhythm pattern memory 6, and the reading start position is set to the head position of the ending pattern corresponding to the value of TCL=0. Thereafter, when the ending performance proceeds to the second bar (i.e., the (n+2) bar shown in FIG. 6) of the ending pattern, the content of the register EBAR is changed to "2". Next, when the ending performance proceeds to the last position of the second bar of the ending pattern, the content of the tempo clock register TCL is cleared. Thus, the judgment result of the step SP45 turns to "YES", and the processing proceeds to the step SP49 via the step SP60. When the judgment result of the step SP49 turns to "YES", the ending performance is completed in the steps SP50 and SP54.

(iv) PROCESS OF FIG. 6(*e*)

In the process of FIG. 6(*e*), the tempo clock register TCL is immediately cleared in the step SP38 next to the step SP37. In other words, the tempo clock register TCL is forced to be cleared, regardless of proceeding of the rhythm performance (see FIG. 6(*a*). Therefore, the processing passes through the steps SP45, SP60, SP49 and SP51 to SP53, and then the processes of the steps SP26 to SP30 are executed, so that the ending performance will be immediately started in accordance with the ending pattern of the mode "0". In this case, the end timing of the ending performance is controlled as similar to (iii) process of FIG. 6(*d*). Since the tempo clock register TCL is forced to be cleared at a start timing of the ending performance (see $P_4$ in FIG. 6(*e*)), the end timing of the ending performance is set at a timing; two bars late from the point $P_4$ (see FIG. 6(*e*)). This process (iv) is preferable for the case where the rhythm performance must be immediately stopped.

As apparent from the flowchart shown in FIG. 5, when the judgment result of the step SP23 is "YES", the ending flag EDG is immediately cleared in the step SP35. Hence, when the ending switch 11 is manipulated again while the ending process is proceeding, the CPU 1 judges such manipulation effective. In other words, the state of the ending process must depend on the timing when the ending switch 11 is manipulated for the second time.

As described heretofore, according to the present embodiment, it is possible to execute the ending performance based on the mode selection by the ending mode selecting switch 8 and one of the states shown in FIGS. 6(*b*) to 6(*e*) selected by the manipulating timings of the ending switch 11.

In the ending mode "1", the manipulating timing of the ending switch 11 controls the start timing of the ending performance and also vary the start position (i.e., positions a1 to a3 and b1 to b3) for reading out the ending pattern. For this reason, it is possible to execute more natural and musical ending performance.

Incidentally, in order to execute the process of FIG. 6(*b*) in the present embodiment, the ending performance is started from the note preceding to the next bar. However, the start timing of the ending performance is not limited to such timing, hence, it is possible to set the start timing at another arbitrary timing. Further, it is possible to vary such start timing, so that the desirable start timing can be set just before starting the performance.

In the present embodiment, the automatic rhythm performance apparatus according to the present invention is applied to the electronic musical instrument. Of course, it is possible to apply the present invention to the automatic rhythm performance apparatus for the exclusive use of executing the automatic rhythm performance.

Above is the description of the present embodiment. This invention may be practiced or embodied in still other ways without departing from the spirit or essential character thereof. Therefore, the preferred embodiment described herein is illusrative and not restrictive, the scope of the invention being indicated by the appended claims and all variations which come within the meanings of the claims are intended to be embraced therein.

What is claimed is:

1. An automatic rhythm performance apparatus having ending performance function comprising:

(a) an ending manipulation member for commanding an ending performance to be executed;

(b) judging means for judging whether said ending manipulation member is manipulated before or after a set timing within one bar;

(c) ending start control means for controlling a start timing of said ending performance based on a judgment result of said judging means, said ending start control means starting said ending performance at a timing which advances by a predetermined timing from a start timing of a next bar when said ending manipulation member is manipulated before said set timing, said ending start control means starting said ending performance at said start timing of the next bar when said ending manipulation member is manipulated after said set timing; and (d) ending performance means for executing said ending performance based on a predetermined ending pattern from a start timing determined by said ending start control means.

2. An automatic rhythm performance apparatus having ending performance function comprising:

(a) memory means for pre-storing a plurality of rhythm patterns each comprising a normal pattern and an ending pattern;

(b) rhythm selecting means for selecting one of said rhythm patterns;

(c) ending control means for commanding an ending performance to be or not to be executed, reading out said ending pattern of said rhythm pattern selected by said rhythm selecting means from said memory means and determining a start timing of said ending rhythm performance; and (d) rhythm source means for generating a rhythm tone in accordance with said normal pattern of said rhythm pattern selected by said rhythm selecting means when said ending control means commands said ending performance not to be executed, said rhythm source means generating another rhythm tone in accordance with said ending pattern to thereby execute said ending performance from said start timing when said ending control means commands said ending performance to be executed.

3. An automatic rhythm performance apparatus according to claim 2 further comprising:

(a) tempo setting means for setting a tempo of a rhythm performance to be executed;

(b) control means for generating tempo data corresponding to said tempo set by said tempo setting means; and (c) tempo oscillator means for outputting a pulse signal having a frequency corresponding to said tempo data, a period of a predetermined number of pulses within said pulse signal being set identical to a period of one bar, said rhythm source means generating said rhythm tones based on said tempo data.

4. An automatic rhythm performance apparatus according to claim 3, wherein said ending control means comprises (a) an ending switch for commanding said ending performance to be or not to be executed; and (b) a mode switch for selecting one among plural ending modes, each of said rhythm patterns comprising one normal pattern and two ending patterns one of which is selected by said mode switch, said start timing being determined by a manipulating timing of said ending switch and said ending mode selected by said mode switch, said manipulating timing being detected by counting a number of pulses of said pulse signal.

5. An automatic rhythm performance apparatus according to claim 4, wherein one bar is divided into a former part and a latter part based on said number of pulses of said pulse signal so that said manipulating timing belongs to one of said former part and said latter part within one bar, said start timing being determined by said ending mode selected by said mode switch and by whether said manipulating timing belongs to said former part or said latter part.

6. An automatic rhythm performance apparatus according to claim 3, wherein said control means comprises a central processing unit (CPU).

7. An automatic rhythm performance apparatus according to claim 2, wherein said memory means comprises a read only memory (ROM) or a random access memory (RAM).

* * * * *